United States Patent
Arastafar

(10) Patent No.: US 8,698,761 B2
(45) Date of Patent: Apr. 15, 2014

(54) ELECTRONIC DEVICE

(75) Inventor: Martin Arastafar, Toronto (CA)

(73) Assignee: BlackBerry Limited, Waterloo (CA)

( * ) Notice: Subject to any disclaimer, the term of this patent is extended or adjusted under 35 U.S.C. 154(b) by 400 days.

(21) Appl. No.: 12/771,883

(22) Filed: Apr. 30, 2010

(65) Prior Publication Data

US 2011/0267281 A1    Nov. 3, 2011

(51) Int. Cl.
*G06F 3/041*    (2006.01)

(52) U.S. Cl.
USPC ................... 345/173; 345/156; 455/575.4

(58) Field of Classification Search
USPC ............... 345/156, 157, 161, 173; 455/566, 455/575.1, 575.4, 90.3
See application file for complete search history.

(56) References Cited

U.S. PATENT DOCUMENTS

| | | | |
|---|---|---|---|
| 6,349,220 B1* | 2/2002 | Prior et al. | 455/566 |
| 6,473,069 B1* | 10/2002 | Gerpheide | 345/157 |
| 6,681,124 B2* | 1/2004 | Prior et al. | 455/563 |
| 6,909,424 B2* | 6/2005 | Liebenow et al. | 345/169 |
| 6,944,472 B1* | 9/2005 | Ishigami | 455/550.1 |
| 6,965,783 B2* | 11/2005 | Pirkola et al. | 455/550.1 |
| 7,085,584 B2* | 8/2006 | Shima | 455/550.1 |
| 7,123,243 B2* | 10/2006 | Kawasaki et al. | 345/173 |
| 7,376,449 B2* | 5/2008 | Mizuta et al. | 455/575.3 |
| 7,469,156 B2* | 12/2008 | Kota et al. | 455/575.4 |
| 7,705,799 B2* | 4/2010 | Niwa | 345/1.1 |
| 7,800,592 B2* | 9/2010 | Kerr et al. | 345/173 |
| 8,185,098 B2* | 5/2012 | Lee | 455/418 |
| 8,259,083 B2* | 9/2012 | Kim | 345/173 |
| 8,265,717 B2* | 9/2012 | Gorsica et al. | 455/575.3 |
| 8,493,338 B2* | 7/2013 | Nakajoh | 345/173 |
| 8,497,884 B2* | 7/2013 | Cholewin et al. | 345/678 |
| 2004/0198437 A1* | 10/2004 | Yamamoto et al. | 455/556.1 |
| 2004/0263484 A1* | 12/2004 | Mantysalo et al. | 345/173 |
| 2006/0044281 A1* | 3/2006 | Lai | 345/173 |
| 2006/0133881 A1* | 6/2006 | Osburn et al. | 400/489 |
| 2006/0197750 A1* | 9/2006 | Kerr et al. | 345/173 |
| 2007/0142102 A1 | 6/2007 | Kim | |
| 2007/0217132 A1 | 9/2007 | Collins | |
| 2007/0270180 A1* | 11/2007 | Takagi | 455/550.1 |
| 2008/0261666 A1* | 10/2008 | Niitsu et al. | 455/575.4 |

(Continued)

FOREIGN PATENT DOCUMENTS

EP    0913977 A2    5/1999
GB    2393066    3/2004

OTHER PUBLICATIONS http://www.phonesreview.co.uk/2007/12/12/benq-siemens-sl98-totally-mad-weird-slider-on-ebay-this-is-madness/—published Dec. 12, 2007.

(Continued)

*Primary Examiner* — Jason Mandeville
(74) *Attorney, Agent, or Firm* — Geoffrey deKleine; Borden Ladner Gervais LLP

(57) ABSTRACT

An electronic device includes a body and a display assembly. The display assembly includes a housing, a display on one face of the housing, and a first input device located on an opposing face of the housing, adjacent at least one side of the display assembly. The display assembly is connected to the body and moveable relative to the body, between a first position in which the first input device is covered by the body and a second position in which the input device is exposed.

7 Claims, 12 Drawing Sheets

(56) References Cited

U.S. PATENT DOCUMENTS

| | | | |
|---|---|---|---|
| 2008/0309640 A1* | 12/2008 | Hong | 345/173 |
| 2009/0096749 A1* | 4/2009 | Kawahara et al. | 345/162 |
| 2009/0131117 A1* | 5/2009 | Choi | 455/566 |
| 2009/0295743 A1* | 12/2009 | Nakajoh | 345/173 |
| 2010/0328250 A1* | 12/2010 | Gorsica et al. | 345/174 |
| 2011/0157020 A1* | 6/2011 | Huang et al. | 345/167 |

OTHER PUBLICATIONS http://www.mobilewhack.com/mapple-phone-anyone/—published at least as early as Jan. 20, 2010.

http://www.patrickbaudisch.com/projects/lucidtouch/applications/index.html published at least as early as Apr. 30, 2010.

European Application No. 10161671.2, Extended European Search Report dated Oct. 7, 2010.

* cited by examiner

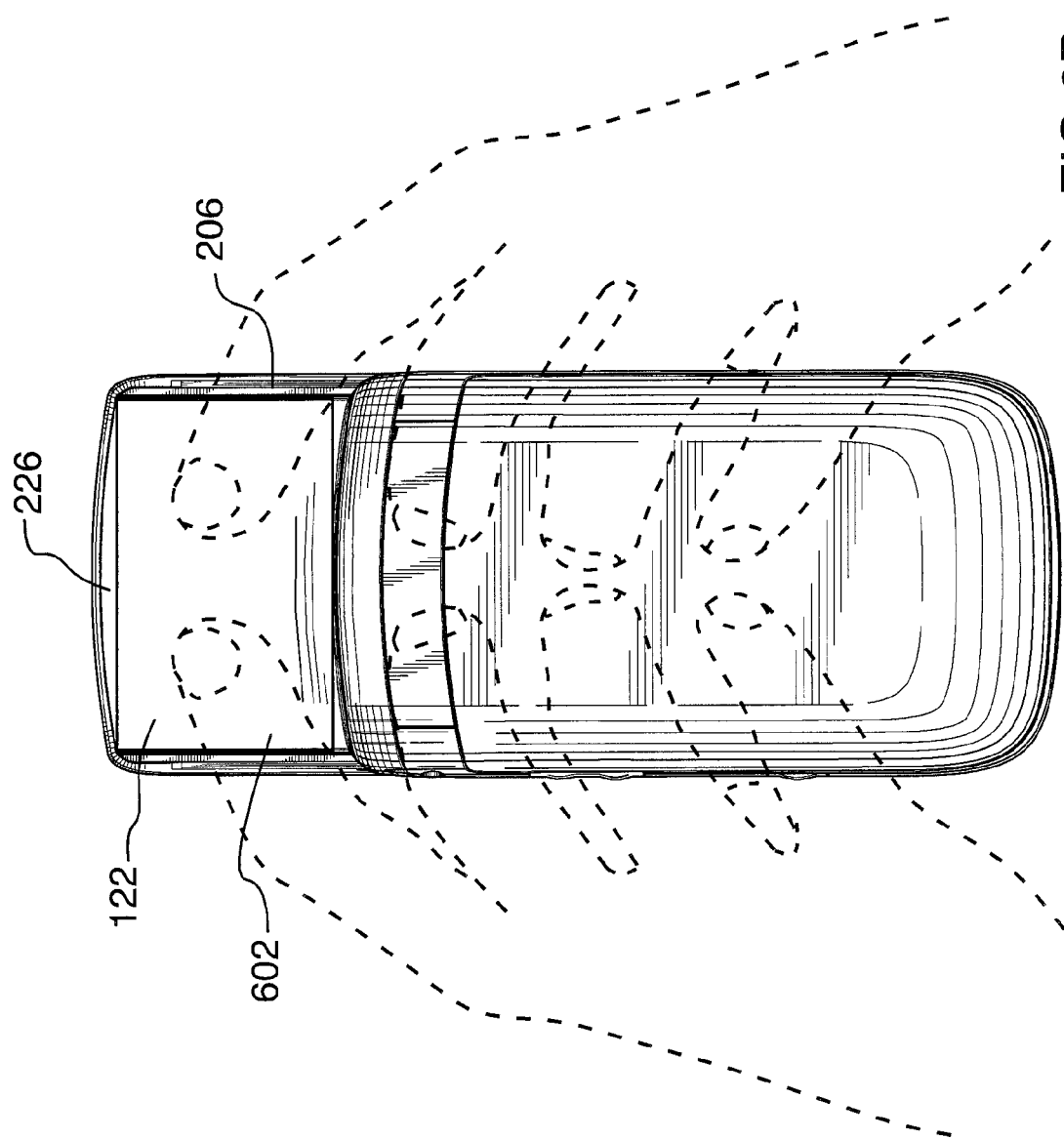

ELECTRONIC DEVICE

FIELD OF TECHNOLOGY

The present disclosure relates to electronic devices, including but not limited to electronic devices that have touch-sensitive displays.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

Improvements in portable electronic devices are desirable.

BRIEF DESCRIPTION OF THE DRAWINGS

Embodiments of the present disclosure will now be described, by way of example only, with reference to the attached Figures, wherein:

FIG. 6A and FIG. 6B are rear views of another example portable electronic device with the display assembly in a second position;

DETAILED DESCRIPTION

Figure 1:
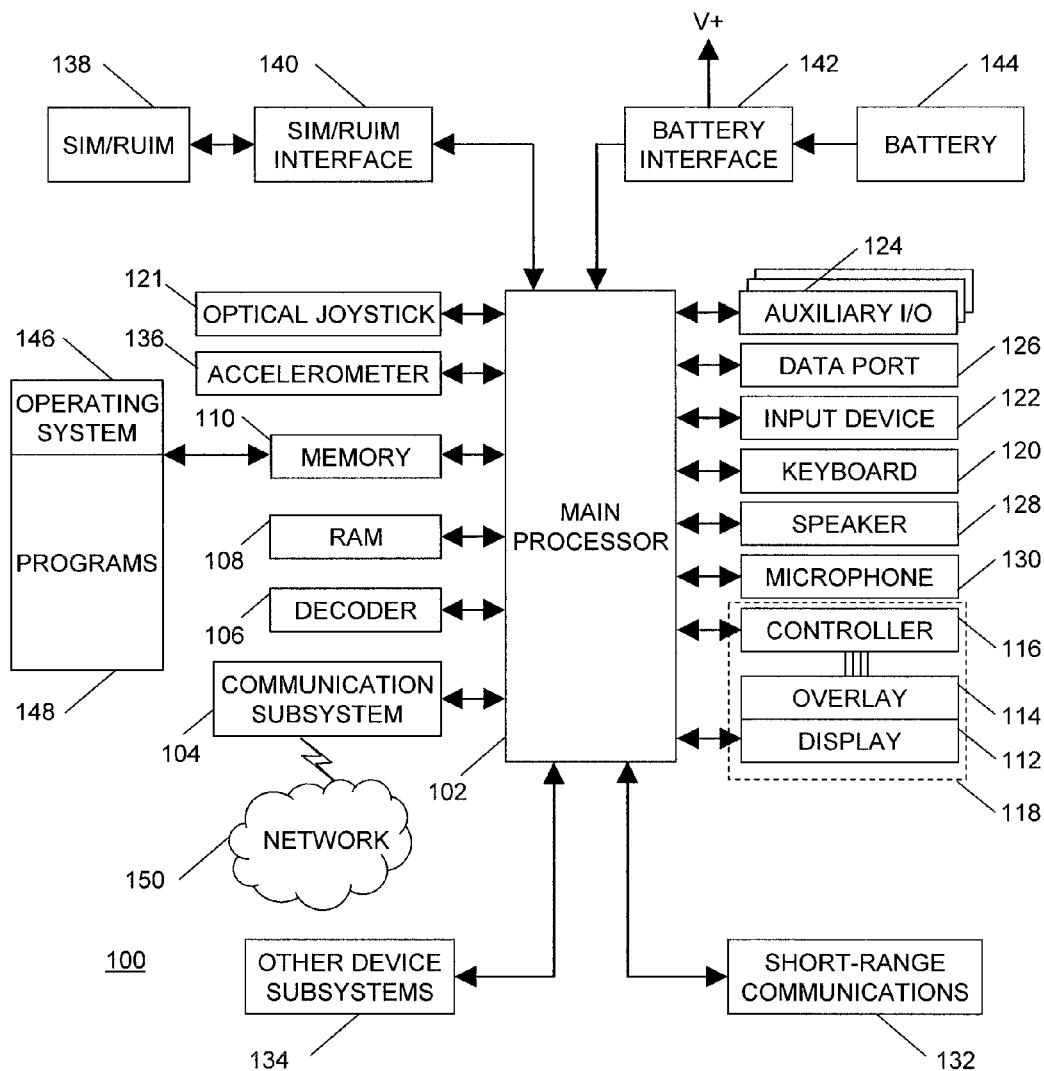
FIG. 1 is a simplified block diagram of components including internal components of a portable electronic device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Referring first to FIG. 1, a block diagram of components of the portable electronic device 100 is shown. The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a memory 110, a display 112 with a touch-sensitive overlay 114 connected to an electronic controller 116 that together comprise a touch-sensitive display 118, an auxiliary input/output (I/O) subsystem 124, a data port 126, a speaker 128, a keyboard 120, an optical joystick 121, an input device 122, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other features that may be displayed or rendered on a portable electronic device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the memory 110.

The portable electronic device 100 also includes an operating system 146 and software components 148 that are executed by the processor 102 and are typically stored in a persistent, updatable store such as memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Referring to FIG. 2 through FIG. 4B, perspective views of an example of the portable electronic device 100 are shown. The electronic device 100 generally includes a body 202 and a display assembly 204 that includes a housing 206. The display 118 is disposed on one face of the housing 206, and the input device 122 is disposed on an opposing face of the housing 206, adjacent at least one side of the display assembly 204. The display assembly 204 is connected to the body 202 and moveable relative to the body 202, between a first position, shown in FIG. 2, in which the input device 122 is covered by the body 202 and a second position, shown in FIG. 3A, FIG. 3B, FIG. 4A, and FIG. 4B, in which the input device 122 is exposed.

The body 202 includes a back 208 and a front 210. The back 208 may include a plate 209 that is releasably attached for insertion and removal of, for example, the battery 144 and the SIM/RUIM card 138 into the body 202. Sides 212 of the body 202 extend between the back 208 and the front 210. The sides 212 may include one or more of the auxiliary I/O devices 124 including, for example, a headphone/microphone jack and buttons for input. In the present example, the body 202 includes the keyboard 120. The keyboard 120 is located at the front 210 of the body 202 and is covered by the display assembly 204 and hidden between the display assembly 204 and the body 204 when the display assembly 204 is in the second position relative to the body 202. While the keyboard 120 in the present example is a physical keyboard, other input devices may be utilized. For example, a touch-sensitive input surface may be utilized. Further, a full keyboard may be provided, or a reduced keyboard in which alphanumeric characters share keys of the keyboard. Alternatively, a keypad may be utilized.

The display assembly 204 includes the display 112 which may be an LCD display. Optional components including a backlight may also be included. The display 112 in the present example, is part of the touch-sensitive display 118, including the touch-sensitive overlay 114 to detect touches thereon. The display 112 is framed by a housing 206 of the display assembly 204 and is generally rectangular with opposing parallel long sides 214 and opposing parallel short sides 216. The display 112 is housed in the housing 206 such that the display 112 is exposed at the front face, referred to as the front, of the display assembly 204. The speaker 128 is located near one end 220 of the housing 206, adjacent a short side 216 of the display 118. A further input device is located near the opposite end of the housing 206, adjacent the opposing short side 216 of the display 112. In the present embodiment, the further input device is the optical joystick 121. The further input device is optional, however, and other input devices may be utilized such as, for example, a trackball, a touchpad or any other suitable input device.

Figure 4A:
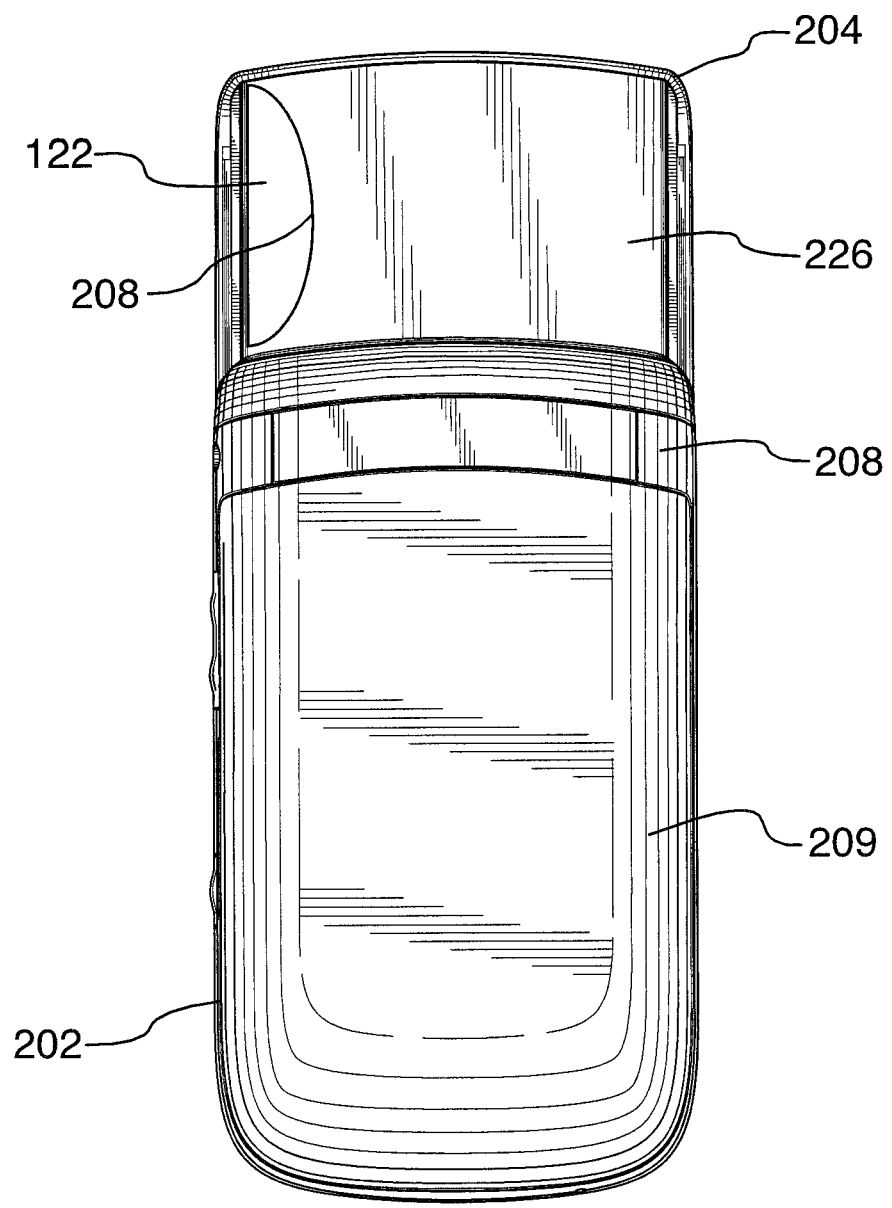
FIG. 4A and FIG. 4B are rear views of the example portable electronic device of FIG. 2, with the display assembly in the second position.
Figure 4B:
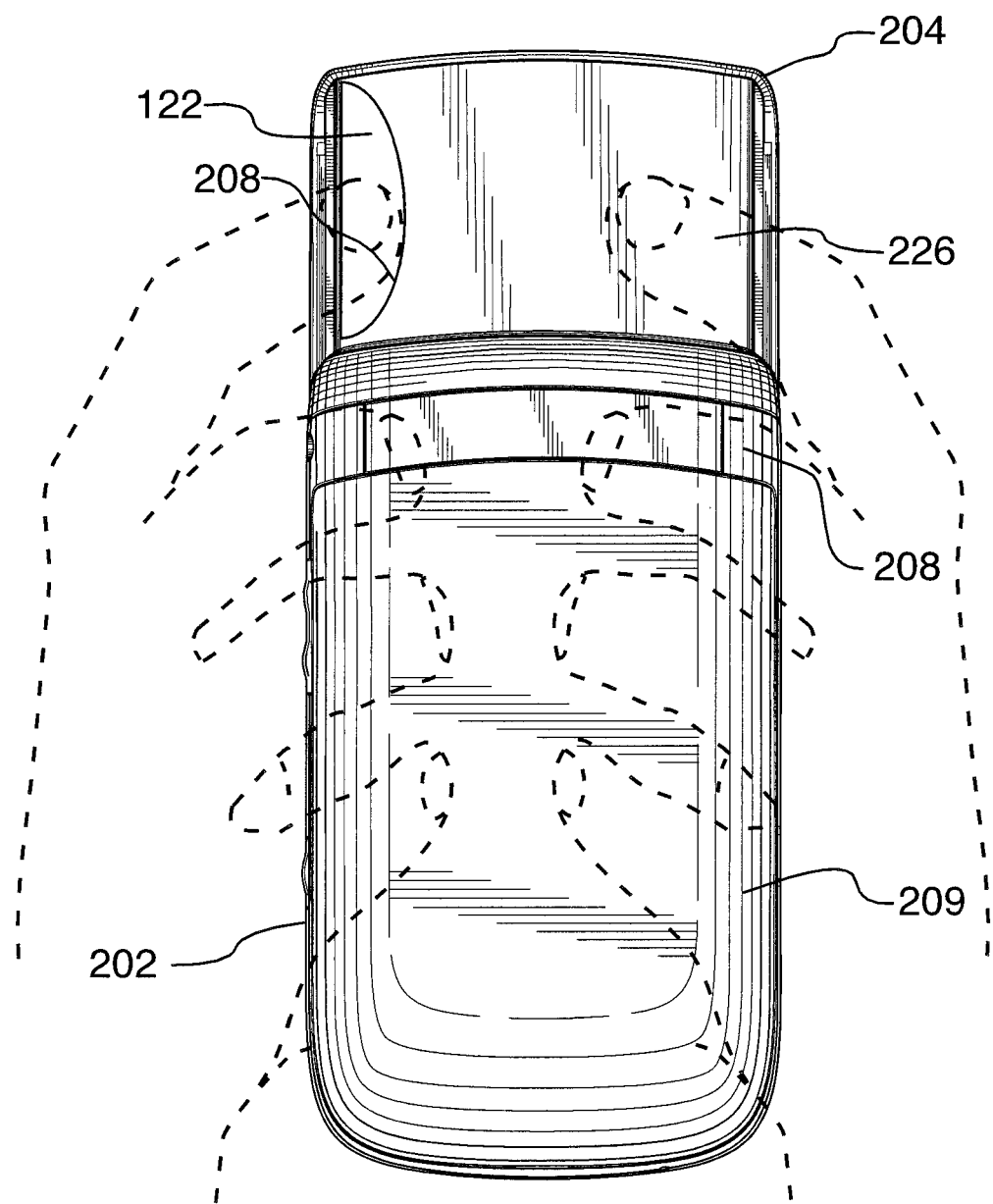

A back face 226, also referred to as a back 226, of the display assembly 204 includes the input device 122 which, in the example shown in FIG. 4A and FIG. 4B is a touch-sensitive input device 122. The touch-sensitive input device includes, for example, a touch-sensitive overlay disposed on a back surface of the housing 206 of the display assembly 204. For the purpose of the present example, the touch-sensitive input device 122 is semicircular and is located on the back surface of the housing 206, near one side. The touch-sensitive input device 122 may be similar to the touch-sensitive overlay 114 and may be connected to the main processor 102 via a separate controller or may be connected via the controller 116 that connects the overlay 114 of the touch-sensitive display 118. In the present example, the touch-sensitive input device 122 is a capacitive touchpad that includes layers in a stack. The layers include, for example, a protective cover and touch sensor layers separated by an insulating layer.

A guide 228 is located around the periphery of the touch-sensitive input device 122. The guide 228 may be a ridge, which may be formed in the back surface of the housing 206, for example, to facilitate tactilely locating the touch-sensitive input device 122 when the portable electronic device 100 is in use. The guide is not limited to a ridge as other guides such as depressions or dimples may be utilized around the touch-sensitive input device 122, or incorporated into the touch-sensitive input device 122 for tactilely locating the touch-sensitive input device 122.

The display assembly 204 is moveably connected to the body 202 in any suitable manner such that the display assembly 204 is moveable from the first position to the second position. For example, the display assembly 204 may include a slide plate at the back 226, along which the body 202 may slide. Alternatively, the body 202 may include a slot in which a projection, that projects from the back 226 of the display assembly 204, may slide. In yet another example, the display assembly 204 may be connected to the body 202 and may rotate and translate utilizing a rack and pinion mechanism that forms part of the body 202 and display assembly 204. Still other connections may be utilized to facilitate movement of the display assembly 204 relative to the body 202, between the first and second positions.

Figure 2:
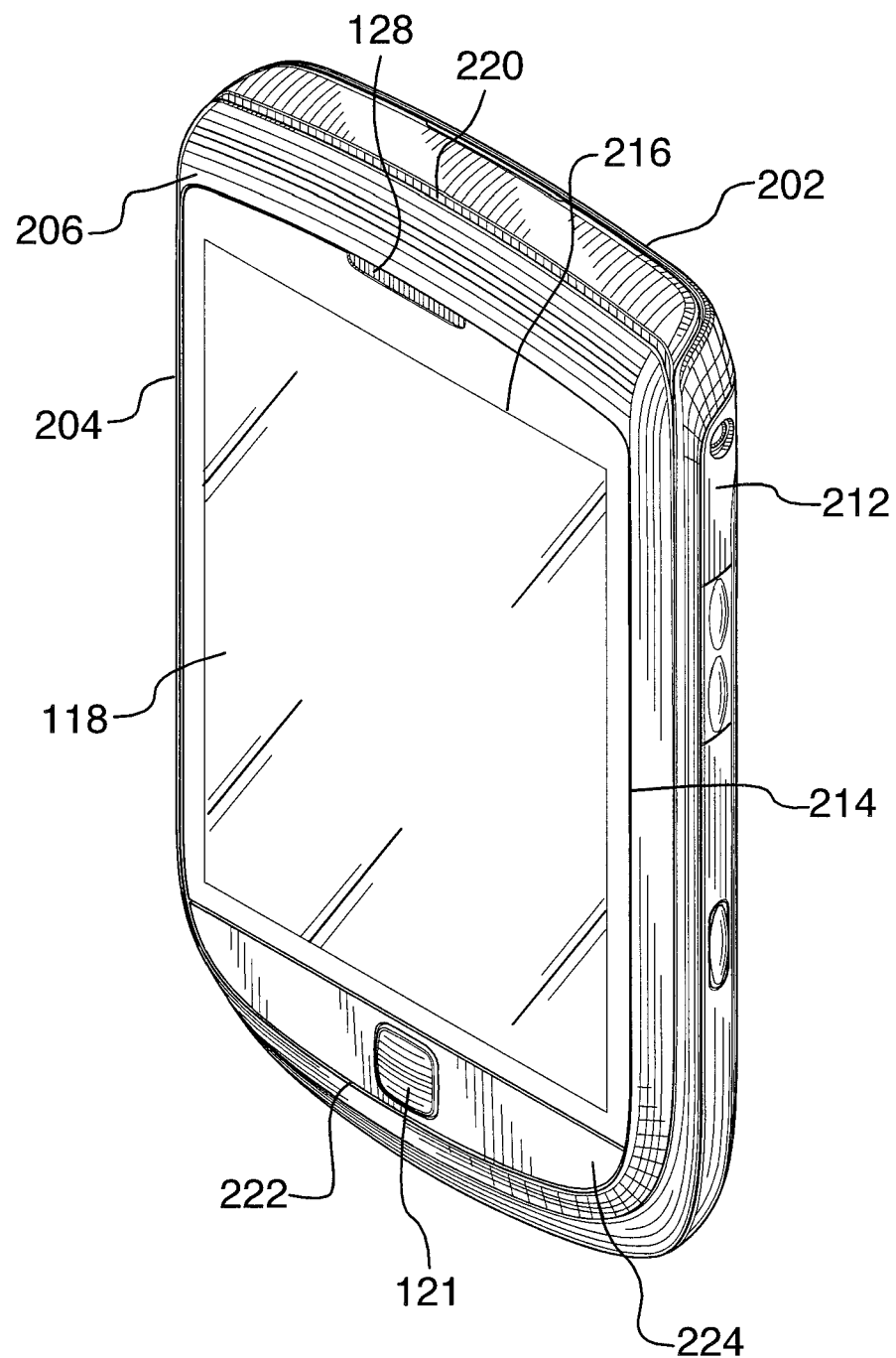
FIG. 2 is a perspective view of an example of a portable electronic device including a display assembly in a first position.

As described above, the display assembly 204 is moveable relative to the body 202, between the first position shown in FIG. 2 and the second position shown in FIG. 3A, FIG. 3B, FIG. 4A, and FIG. 4B. In the position shown in FIG. 2, the front 210 of the body 202 is hidden by the display assembly 204 and the touch-sensitive input device 122 is disposed on the back 226 of the display assembly 206 and hidden by the body 202. When the display assembly is moved to the second position shown in FIG. 3 and FIG. 4, the keyboard 120 is exposed for input and the touch-sensitive input device 122 is exposed at the back 226 of the housing 206 as a result of the translational movement of the display assembly 204 relative to the body 202.

Figure 3A:
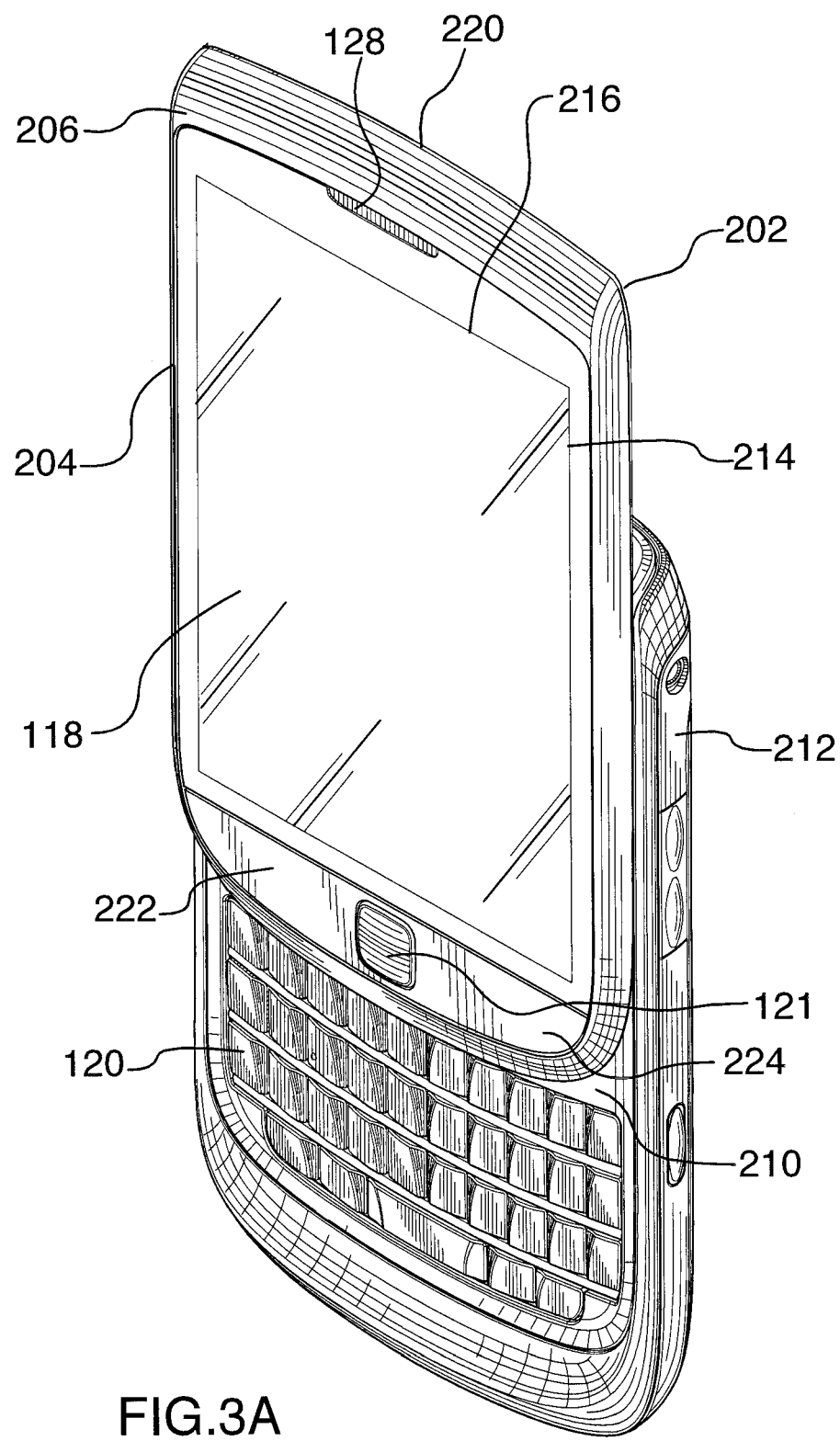
FIG. 3A and FIG. 3B are perspective views of the example portable electronic device of FIG. 2, with the display assembly in a second position.
Figure 3B:
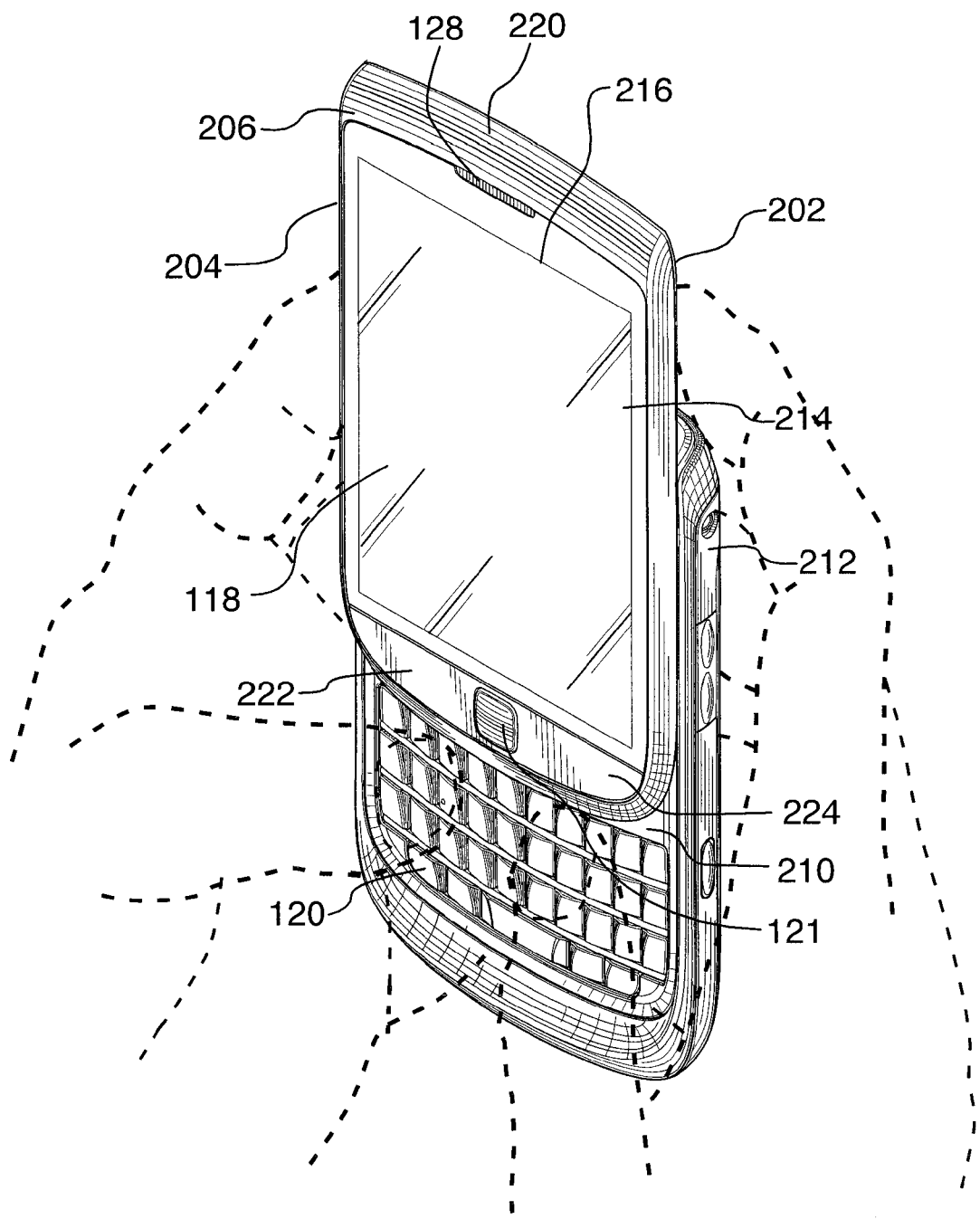

In use, the user may hold or cradle the portable electronic device 100 for input utilizing, for example, the keyboard 120, as shown in FIG. 3B. The touch-sensitive input device 122 may also be utilized, for example, for navigation such as scrolling of a cursor. The touch-sensitive input device 122 may be utilized by touching, for example, with a forefinger (also referred to as the index finger), as shown in FIG. 4B, for navigation through a GUI while cradling the portable electronic device 100, for example, for thumb input utilizing the keyboard 120. The location of the input device 122 adjacent one side of the display assembly 204 facilitates use of both the input device 122 and the keyboard 120 when the device is cradled as described. The input device 122 may therefore be used without repositioning a hand or hands during use of the portable electronic device 100. Use of the portable electronic device 100 is thereby facilitated without having to reposition a hand or hands between typing and input utilizing the input device 122, thereby reducing device use and power consumption.

Figure 5A:
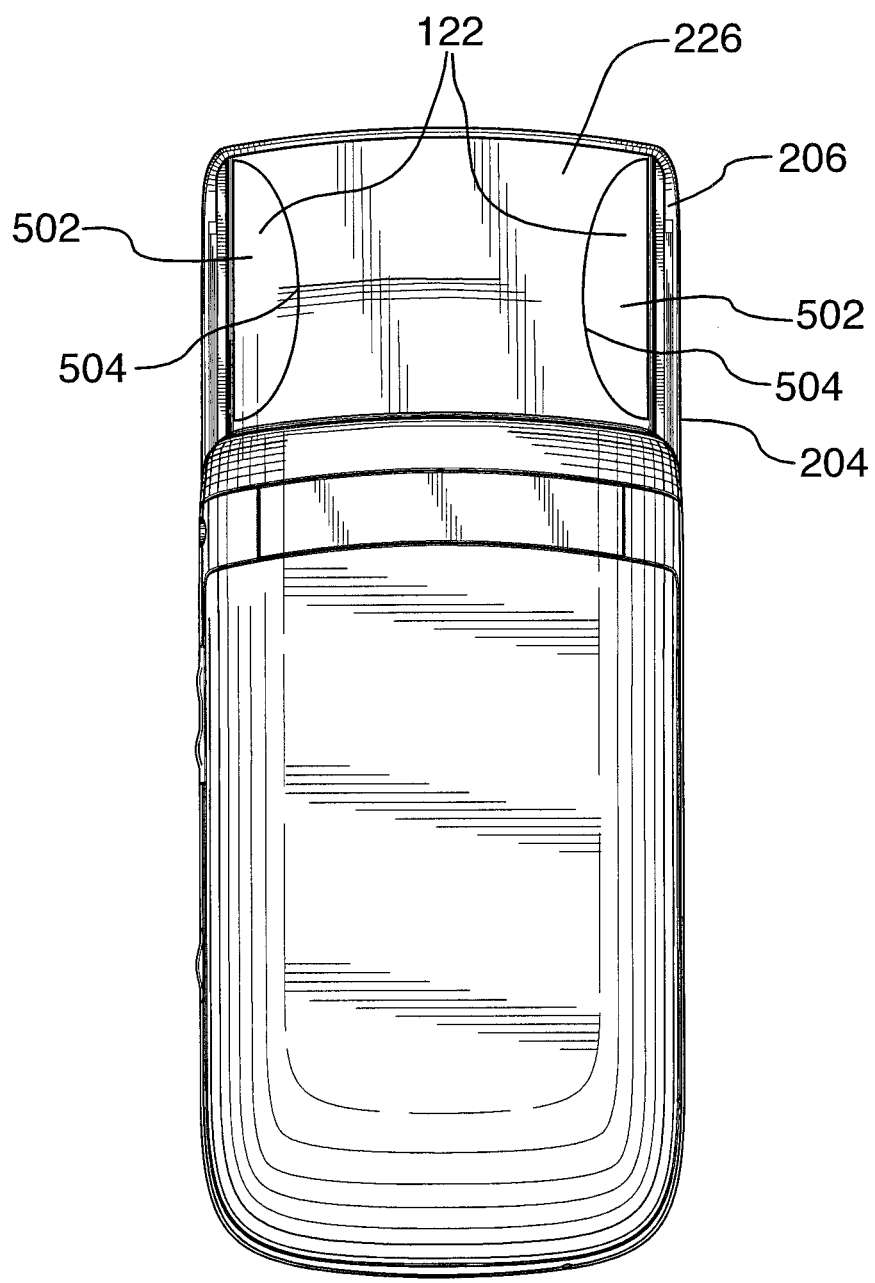
FIG. 5A and FIG. 5B are rear views of another example portable electronic device with the display assembly in a second position.
Figure 5B:
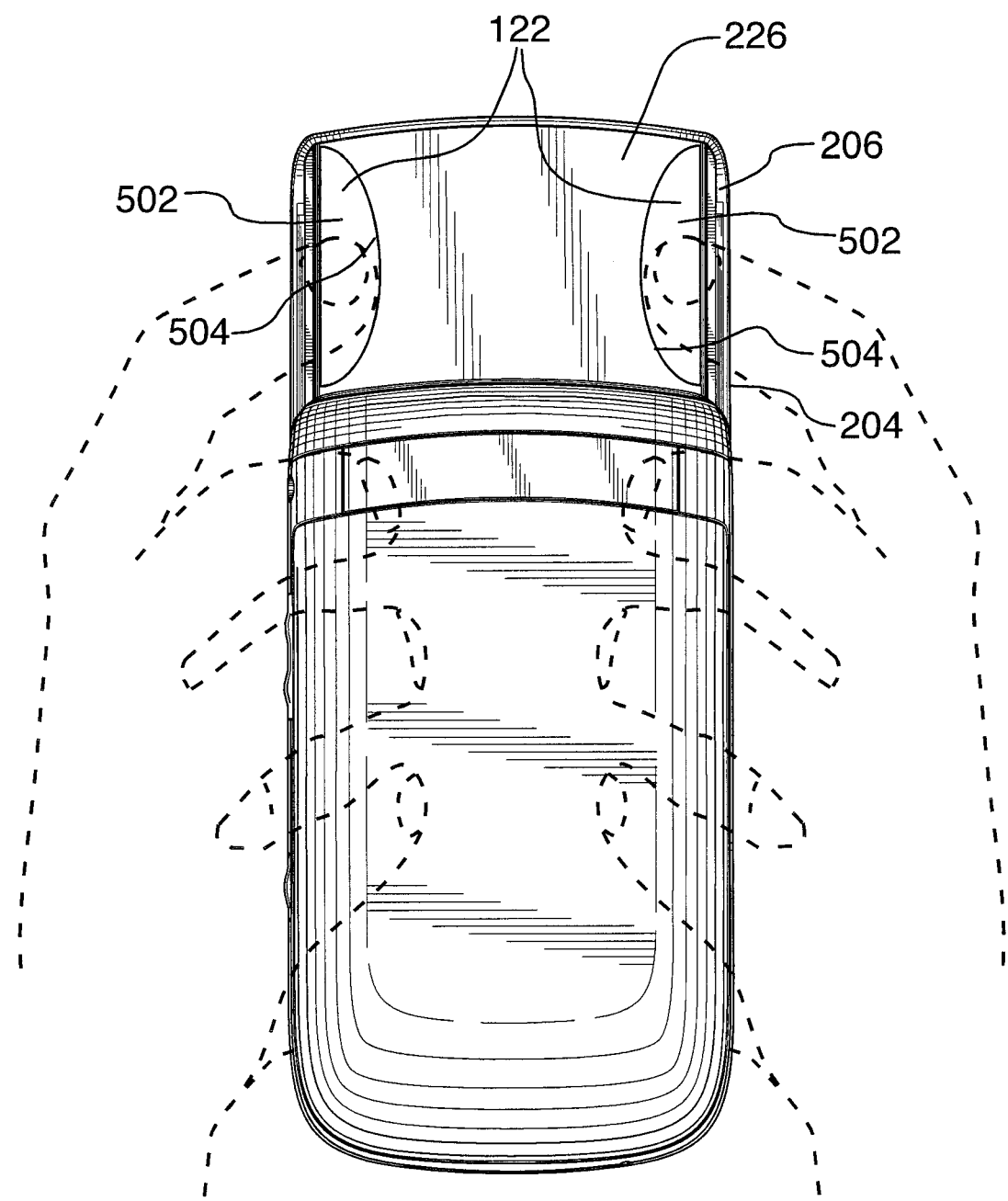

The input device 122 is not limited to the touch-sensitive input device 122 shown in FIG. 4A and FIG. 4B. Multiple touch-sensitive input devices 122 may be utilized on the back 226 of the display assembly 204, as shown in FIG. 5A and FIG. 5B, which shows two touch-sensitive areas 502. The touch-sensitive areas 502 in the example of FIG. 5A and FIG. 5B are semicircular and each of the touch-sensitive areas 502 is located adjacent a respective one of opposing sides of the housing 206. Guides 504 are located around the periphery of each area 502.

The touch-sensitive input areas 502 may be utilized by touching, for example, with a forefinger (also referred to as the index finger), as shown in FIG. 5B, for navigation through a GUI while cradling the portable electronic device 100, for example, for thumb input utilizing the keyboard 120. The location of the input areas 502 adjacent each side of the display assembly 204 facilitates use of both the input areas 502 and the keyboard 120 when the device is cradled as described. The input areas 502 may therefore be used without repositioning a hand or hands during use of the portable electronic device 100. Use of the portable electronic device 100 is thereby facilitated without having to reposition a hand or hands between typing and input utilizing the input areas 502, thereby reducing device use and power consumption.

Figure 6A:
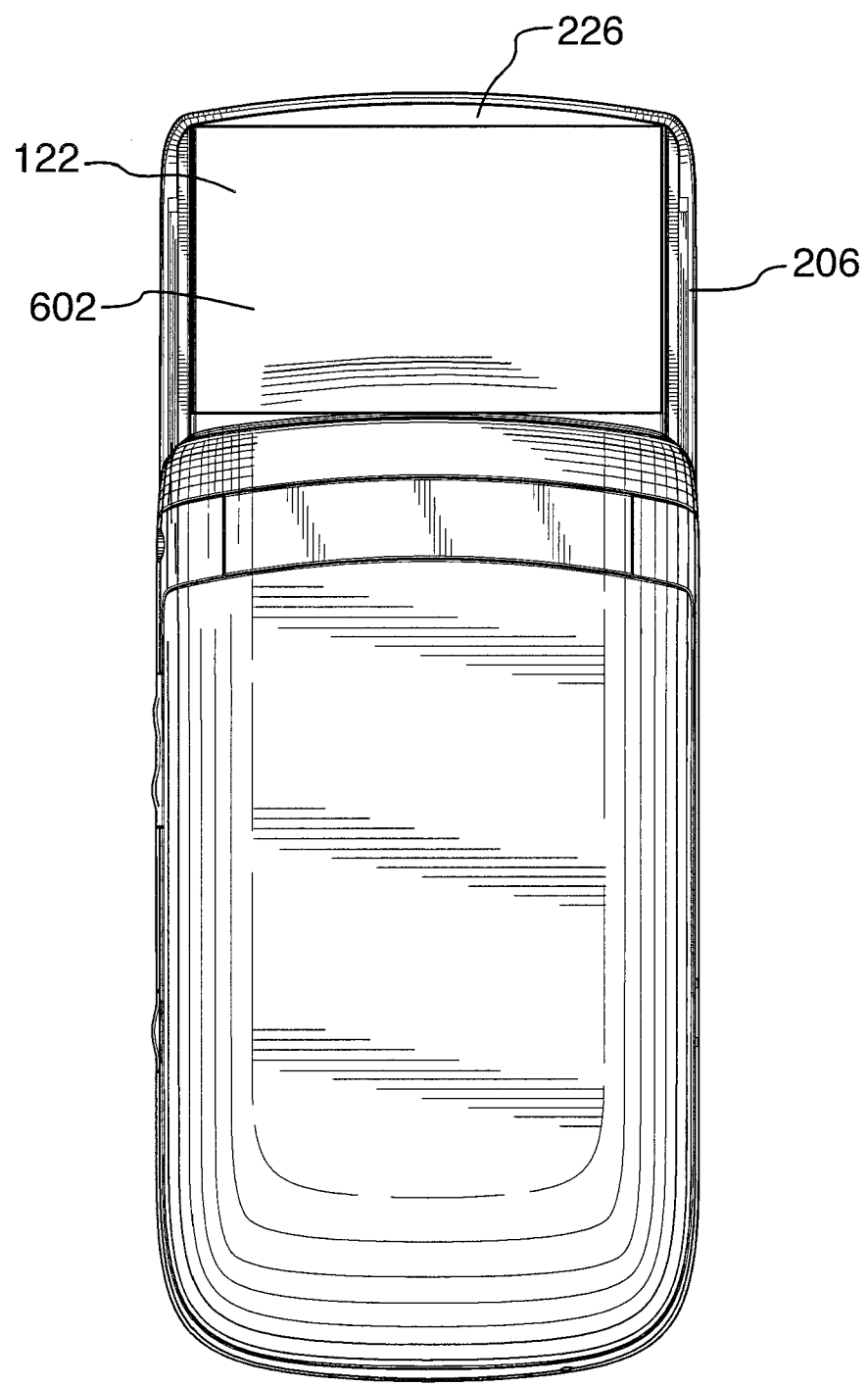
Figures 8, 9A:
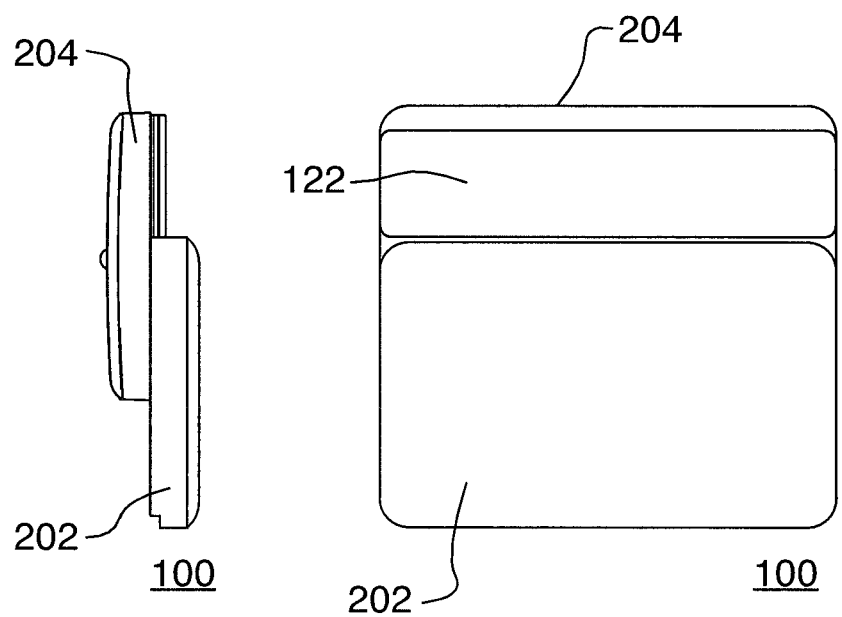
FIG. 8 is a side view of the portable electronic device of FIG. 7 with the display assembly in a second position.
FIG. 9A and FIG. 9B are rear views of the portable electronic device of FIG. 7 with the display assembly in a second position.

FIG. 6A and FIG. 6B show yet another example of a touch-sensitive input device 122. In the present example, the touch-sensitive input device 122 comprises a generally rectangular touchpad 602 on the back surface of the housing 206. The touchpad 602 extends across the width of the back 226 of the housing 206 such that the touchpad 602 is adjacent both of the opposing sides of the housing 206.

The touchpad 602 may be utilized by touching, for example, with a forefinger (also referred to as the index finger) or with both forefingers, as shown in FIG. 6B, for navigation through a GUI while cradling the portable electronic device 100, for example, for thumb input utilizing the keyboard 120. The location of the touchpad 602 adjacent each side of the display assembly 204 facilitates use of both the input areas 502 and the keyboard 120 when the device is cradled as described. The touchpad 602 may therefore be used without repositioning a hand or hands during use of the portable electronic device 100. Use of the portable electronic device 100 is thereby facilitated without having to reposition a hand or hands between typing and input utilizing the touchpad 602, thereby reducing device use and power consumption.

FIG. 7A, FIG. 7B, FIG. 8, FIG. 9A, and FIG. 9B show a front view, a side view and back view of a portable electronic device 100 according to another example. The portable electronic device 100 of the present example includes similar features to the portable electronic device shown and described above with reference to FIG. 2, FIG. 3A, FIG. 3B, FIG. 4A, and FIG. 4B. In the present example, however, the body 202 and the display assembly 204 slide relative to each other such that the display 112 is in the landscape orientation when the keyboard 120 is utilized for typing. Thus, when the portable electronic device 100 is held in the orientation in which the keyboard 120 is upright, the keyboard 120 is located below a long side of the display 112. The touch-sensitive input device 122 is exposed when in the second position and comprises a generally rectangular touchpad at the back of the housing 206. The touchpad extends across the width of the back of the housing such that the touchpad is adjacent both of the opposing sides short of the housing.

Figure 7A:
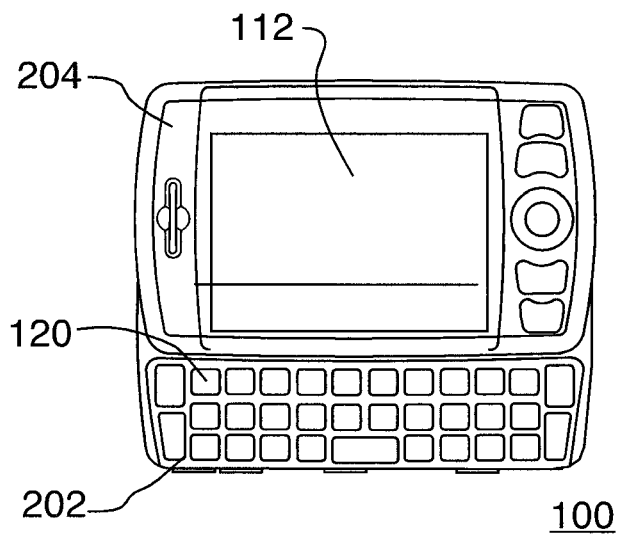
FIG. 7A and FIG. 7B are front views of another example portable electronic device with the display assembly in a second position.
Figure 7B:
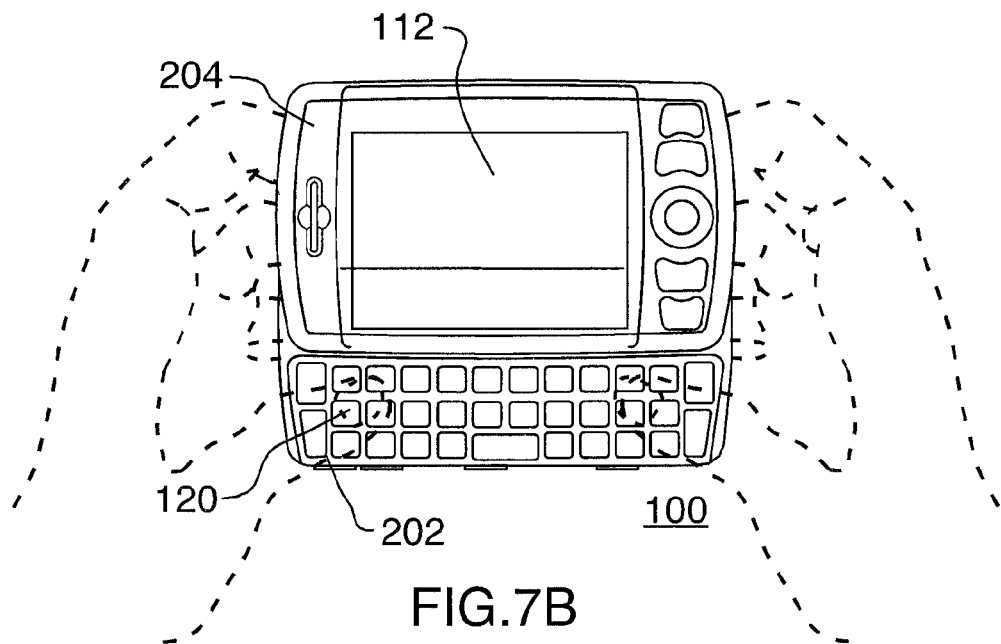
Figure 9B:
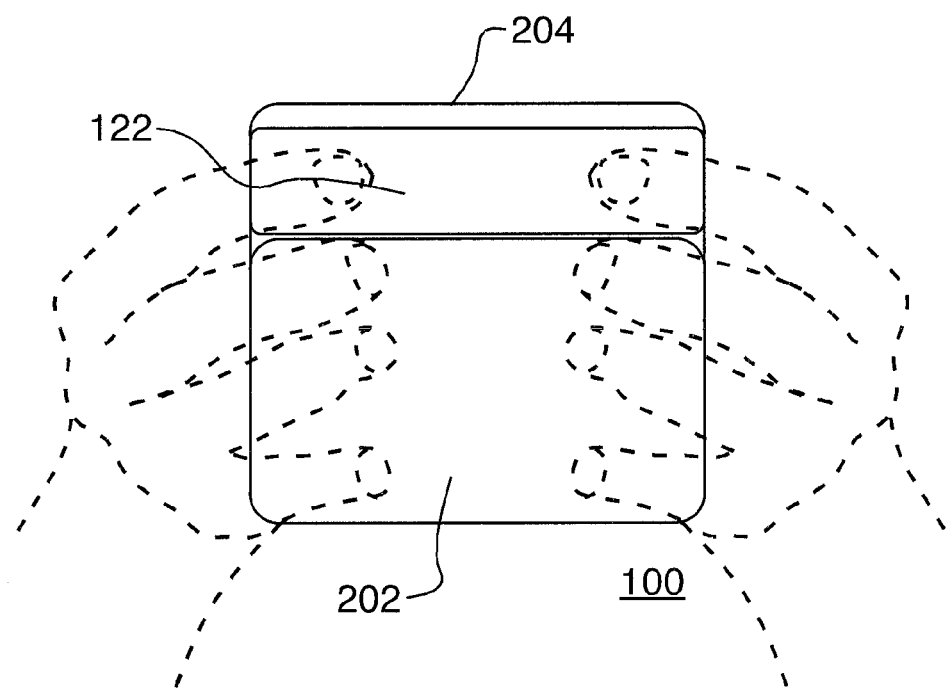

As in the first-described example, the user may hold or cradle the portable electronic device 100 for input utilizing, for example, the keyboard 120, as shown in FIG. 7B. The touch-sensitive input device 122 may also be utilized, for example, for navigation such as scrolling of a cursor. The touch-sensitive input device 122 may be utilized by touching, for example, with either of the two forefingers or with both forefingers, as shown in FIG. 9B, for navigation through a GUI while cradling the portable electronic device 100, for example, for thumb input utilizing the keyboard 120. The location of the input device 122 adjacent the sides of the display assembly 204 facilitates use of both the input device 122 and the keyboard 120 when the device is cradled as described. The input device 122 may therefore be used without repositioning a hand or hands during use of the portable electronic device 100. Use of the portable electronic device 100 is thereby facilitated without having to reposition a hand or hands between typing and input utilizing the input device 122, thereby reducing device use and power consumption.

Still other touch-sensitive input devices may be utilized including, for example, a trackball, an optical joystick, a trackwheel, a touch-sensitive pad, a track bar, and any combination of these input devices.

The portable electronic device described herein includes a body and a display assembly moveable relative to the body. In the first position, a keyboard and an input device are hidden. In a second position, the display assembly is moved relative to the body and the keyboard of the body is exposed and the input device is exposed on the back of the display assembly The input device on the back of the display assembly provides further input for the portable electronic device on an area of the portable electronic device that may not be otherwise utilized. Further, the location of the input device facilitates cradling of the device for thumb input utilizing the keyboard and for forefinger input utilizing the input device, while holding the back of the portable electronic device with the remaining fingers, without repositioning either or both of the hands. Thus, the forefinger or forefingers may reach the input device without repositioning, saving device use time and power consumption.

According to one aspect, an electronic device is provided. The electronic device includes a body and a display assembly. The display assembly includes a housing, a display on one side of the housing, and a first input device on an opposing side of the housing. The display assembly is connected to the body and is moveable relative to the body, between a first position in which the input device is covered by the body and a second position in which the input device is exposed.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. A handheld electronic device comprising:
a body comprising a keyboard;
a display assembly comprising a housing having a front face, a rear face, and four opposing sides forming a rectangle,
a display on the front face of the housing, and
a first touch-sensitive input device and a second touch-sensitive input device, both the first and second touch-sensitive input devices respectively comprising a capacitive touch-sensitive overlay including capacitive touch sensors, located on the rear face of the housing, the first touch-sensitive input device having a first tactile guide located around a periphery of the first touch-sensitive input device and the second touch-sensitive input device having a second tactile guide located around a periphery of the second touch-sensitive input device, the first touch-sensitive input device being located along one of the opposing sides of the housing such that the first touch-sensitive input device is off-centered along the width of the rear face of the housing, the second touch-sensitive input device being located along another one of the opposing sides of the housing, opposite the first touch-sensitive input device, such that the second touch-sensitive input device is off-centered along the width of the rear face of the housing and the first touch-sensitive input device and the second touch-sensitive input device are separated from each other along the width of the housing, the display assembly connected to the body and slidable relative to the body between a first position in which the display is exposed but the first touch-sensitive input device, the second touch-sensitive input device, and the keyboard are covered by the body, and a second position in which the display, the first touch-sensitive input device, the second touch-sensitive input device, and the keyboard are all exposed.

2. The electronic device according to claim 1, wherein the display comprises a touch-sensitive display.

3. The electronic device according to claim 1, wherein the display assembly comprises a touch-sensitive overlay disposed on the display.

4. The electronic device according to claim 1, wherein the display comprises a touch-sensitive display including a controller and wherein the first touch-sensitive input device and the second touch-sensitive input device are connected to the controller.

5. The electronic device according to claim 1, wherein the first tactile guide and the second tactile guide comprise formations on the rear face of the housing.

6. The electronic device according to claim 1, wherein each of the formations comprise at least one of a ridge, a depression, or a dimple.

7. The electronic device according to claim 1, wherein the touch-sensitive overlay comprises a capacitive touch-sensitive overlay.

* * * * *